(12) United States Patent
Doshi (10) Patent No.: US 8,546,009 B2
(45) Date of Patent: Oct. 1, 2013

(54) METHOD AND APPARATUS FOR THERMAL ENERGY TRANSFER

(76) Inventor: Tulsee Satish Doshi, Portland, OR (US)

( * ) Notice: Subject to any disclaimer, the term of this patent is extended or adjusted under 35 U.S.C. 154(b) by 1328 days.

(21) Appl. No.: 11/657,906

(22) Filed: Jan. 24, 2007

(65) Prior Publication Data

US 2007/0172725 A1 Jul. 26, 2007

Related U.S. Application Data

(60) Provisional application No. 60/762,430, filed on Jan. 25, 2006.

(51) Int. Cl.
*H01M 10/50* (2006.01)

(52) U.S. Cl.
USPC .......................................................... 429/120

(58) Field of Classification Search
USPC ................... 429/120; 165/66, 132, 136, 163
See application file for complete search history.

(56) References Cited

U.S. PATENT DOCUMENTS

| | | | |
|---|---|---|---|
| 3,537,907 A | 11/1970 | Wilson | |
| 3,865,630 A | 2/1975 | Reimers | |
| 4,329,407 A * | 5/1982 | Gross et al. | 429/101 |
| 4,472,468 A * | 9/1984 | Tailor et al. | 428/57 |
| 4,517,263 A | 5/1985 | Reiss et al. | |
| 4,684,589 A * | 8/1987 | Van Dyke, Jr. | 429/184 |
| 5,035,964 A | 7/1991 | Levinson et al. | |
| 5,501,916 A | 3/1996 | Teramoto et al. | |
| 6,010,800 A | 1/2000 | Stadnick et al. | |
| 6,106,972 A | 8/2000 | Kokubo et al. | |
| 6,692,864 B1 * | 2/2004 | Dansui et al. | 429/120 |
| 6,767,666 B2 * | 7/2004 | Nemoto et al. | 429/120 |
| 6,936,079 B2 * | 8/2005 | Janmey | 29/623.1 |
| 2004/0020218 A1 * | 2/2004 | Alford | 62/6 |
| 2005/0016904 A1 * | 1/2005 | Knox-Holmes et al. | 209/590 |

FOREIGN PATENT DOCUMENTS

WO WO8910011 * 10/1989

* cited by examiner

*Primary Examiner* — Melvin Curtis Mayes
*Assistant Examiner* — Bijay Saha
(74) *Attorney, Agent, or Firm* — Portland Intellectual Property, LLC (57) ABSTRACT

A thermal energy transfer element includes a thermally conductive core and, in some embodiments, a sleeve. The core has first and second portions. The first portion is for placement in direct contact with and to be surrounded by an electrolyte. The sleeve surrounds at least the first portion of the transfer element. The first portion conducts thermal energy between the electrolyte and the second portion.

18 Claims, 9 Drawing Sheets

METHOD AND APPARATUS FOR THERMAL ENERGY TRANSFER

CROSS-REFERENCE TO RELATED APPLICATION

This application claims the benefit of U.S. Provisional Patent Application Ser. No. 60/762,430, entitled "USING HEAT SINKS INSIDE A BATTERY TO EXTEND BATTERY LIFE," filed Jan. 25, 2006, and incorporated herein by reference in its entirety.

FIELD OF INVENTION

The field of invention relates to batteries, and more particularly to methods and apparatus for transferring thermal energy to and from a battery.

BACKGROUND

The electric current that a battery produces is the result of an electrochemical, oxidation-reduction reaction. Generally, this reaction is exothermic, i.e., it produces thermal energy or heat as well as an electric potential between the battery's electrodes. Heat in a battery is also produced as a result of current flowing in the electrodes and terminals.

It is important that a battery be stored and operated within a temperature range prescribed for the particular battery chemistry. The reaction rate in a battery depends upon, among other things, temperature. Generally, the higher the temperature of the reactants, the faster the reaction will proceed. A battery stored or operated at high temperatures will have reduced storage or operating lifetimes. Further, a battery operated in a high temperature environment will have a lower voltage across its terminals than one operated within the prescribed temperature range. In addition, a battery operated at temperatures below the prescribed temperature range will produce less current and reach a state of discharge more quickly than a battery operated in the specified temperature environment. Not only is it important that a battery be stored and operated within the prescribed temperature range, it is also important to maintain the battery within the recommended temperatures when recharging the battery.

Accordingly, there is a need for methods and apparatus for transferring thermal energy to and from a battery to maintain the temperature of the battery within a temperature range prescribed for the particular battery chemistry during storage, use, and recharging operations.

SUMMARY

One embodiment is directed to a thermal energy transfer element for placement within a cell of a battery. The element includes a thermally conductive core having first and second portions. The first portion is for placement in direct contact with and to be surrounded by an electrolyte. The second portion is for placement in an environment external to the cell. The first portion conducts thermal energy between the electrolyte and the second portion.

Another embodiment is directed to a thermal energy transfer element that includes a thermally conductive core having first and second portions, and a sleeve. The first portion is for placement in direct contact with and to be surrounded by an electrolyte. The sleeve surrounds at least the first portion of the transfer element. The first portion conducts thermal energy between the electrolyte and the second portion.

Yet another embodiment is directed to a battery that includes at least one cell that contains an electrolyte and at least one thermal energy transfer element for placement within each cell. The thermal energy transfer element includes a thermally conductive core having first and second portions. The first portion is for placement in direct contact with and to be surrounded by the electrolyte. The second portion is for placement in an environment external to the cell. The first portion conducts thermal energy between the electrolyte and the second portion. In addition, the battery may include a sleeve for surrounding at least the first portion.

BRIEF DESCRIPTION OF THE DRAWINGS

In the drawings and description below, the same reference numbers are used in the drawings and the description to refer to the same or like parts, elements, or steps.

DETAILED DESCRIPTION

A battery includes one or more cells and each cell comprises an anode, a cathode, and an electrolyte, as well as a container to hold the components. Thermal energy is generally transferred between the electrolyte and the external environment via the container and to a lesser extent via the battery's terminals. However, there are several disadvantages associated with relying on the container and terminals for heat transfer. First, the battery the container is often not an optimum thermal conductor. Second, the transfer of thermal energy between the electrolyte and the external environment is uneven. Thermal energy in the electrolyte near container walls and terminals is transferred more readily than energy in electrolyte located in regions less proximate to these structures.

Figure 1A:
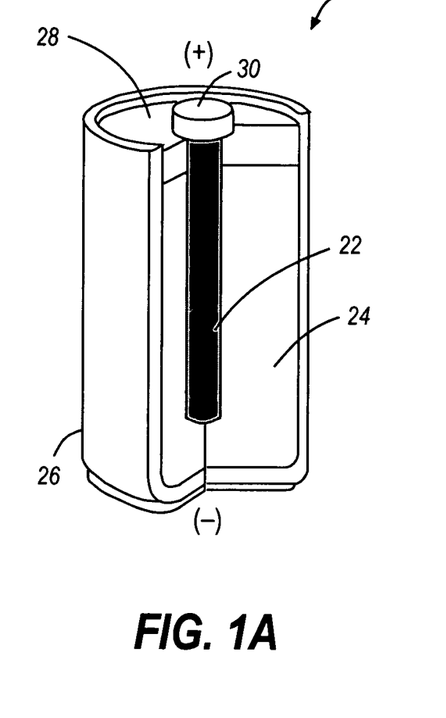
FIG. 1A is a cut-away, side perspective view of an exemplary battery.
Figure 1B:
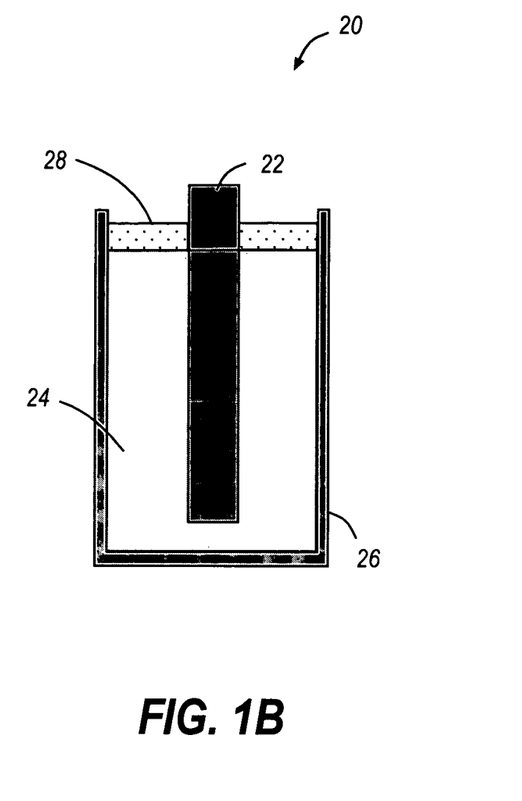
FIG. 1B is a cut-away, side view of the battery.
Figure 1C:
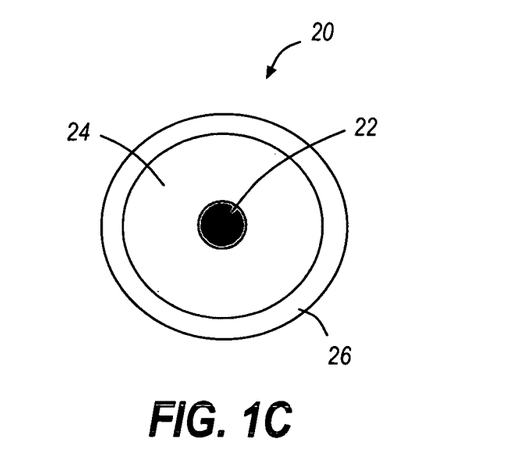
FIG. 1C is a top side view of the battery.

FIG. 1A is a perspective, cut-away, side view of a zinc-carbon battery 20. FIG. 1B is a cut-away, side plan view of the battery 20. FIG. 1C is a top side plan view of the battery 20. The battery 20 includes a carbon rod 22, a paste 24 that contains ammonium chloride, and a container 26, which includes a seal 28. A metal cap 30 covers the end of the carbon rod 22 external to the battery. A base 31 covers the bottom the battery 20. Functionally, the carbon rod 22 is the cathode, the container 26 is the anode, and the paste 24 is the electrolyte. Embodiments of the claimed inventions will be described with reference to the zinc-carbon battery having a paste electrolyte shown in FIGS. 1A-C. However, this is for purpose of illustration, as the claimed inventions are not limited to this particular type of battery.

Figure 2A:
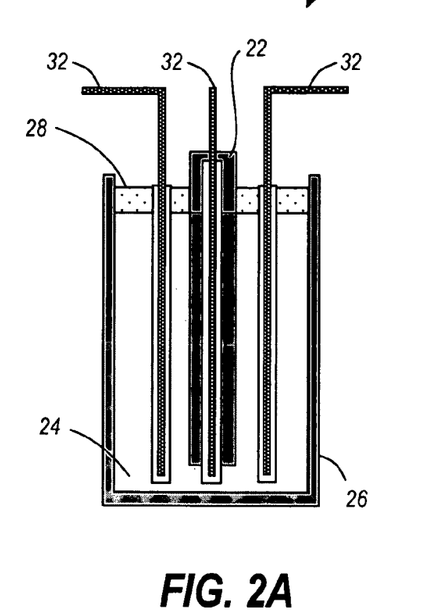
FIG. 2A is a cut-away, side view of the battery of FIGS. 1A-C in which the battery includes a plurality of thermal energy transfer elements according to one embodiment.
Figure 2B:
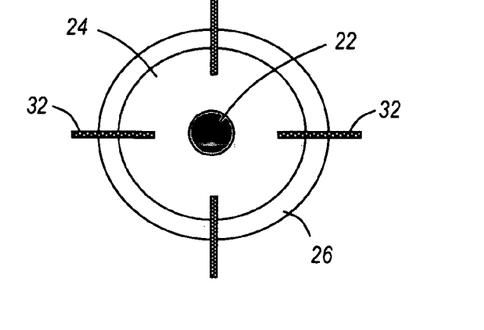
FIG. 2B is a top-side view of the battery of FIG. 2A.

FIGS. 2A and 2B are, respectively, a cut-away, side plan view and a top side plan view of the battery 20 of FIGS. 1A-C, in which the battery 20 includes a plurality of elements 32 for transferring thermal energy to and from the electrolyte 24 according to one embodiment of the claimed inventions. According to the claimed inventions, the thermal energy transfer elements 32 are in direct contact with the electrolyte 34.

Figure 3A:
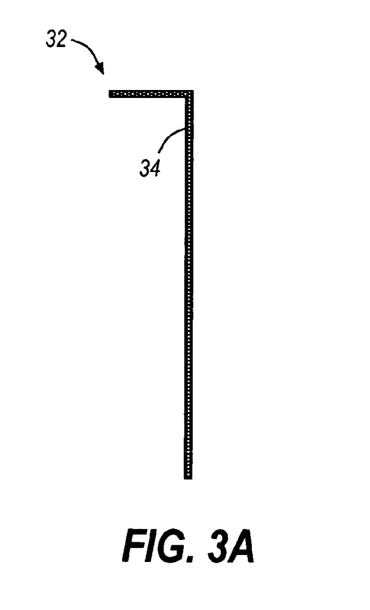
FIG. 3A is a side view of one example of a thermal energy transfer element.

Referring to FIG. 3A, according to one embodiment, each thermal energy transfer element 32 is comprised of a thermally conductive core 34. The shown embodiment of the core 34 is a bar (or rod) with a relatively short, optional portion transverse to the long axis of the bar. The core 34 may be formed from any material capable of conducting a sufficient amount of thermal energy to keep the temperature of the cell within a temperature range prescribed for the particular battery chemistry during storage, use, and recharging operations. In addition, in some embodiments, the core 34 should be formed of a material that does not react with the electrolyte or otherwise interfere with the electrochemical reaction inside the battery container 26. Further, the core 34 should have a melting point sufficiently above the maximum expected internal temperature of the battery. Moreover, the material from which the core 34 is formed is preferably a poor electrical conductor, however, this is not essential in every embodiment. As an example, the core 34 may be a ceramic containing silicon carbide or silicon nitride. For instance, silicon carbide has high thermal conductivity, a high melting point, is chemically inert, and is a poor electrical conductor. As another example, the core 34 may be formed from a suitable composite material, such as a composite that contains oriented pyrolytic graphite suspended in a polymer composition, such as a thermosetting resin, which is chemically inert with respect to the particular electrolyte. One of ordinary skill in the art will be aware of other suitable materials.

Figure 3B:
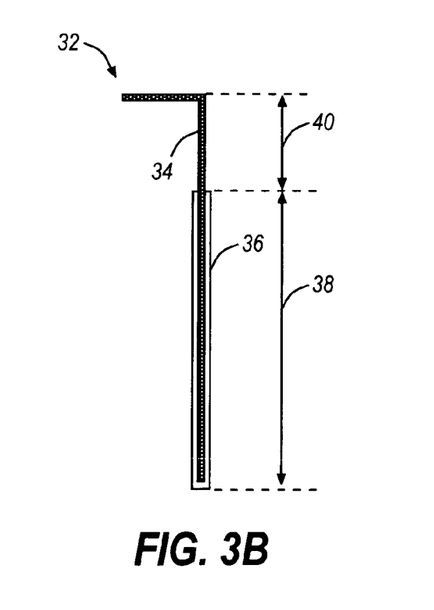
FIG. 3B is a side view of a second example of a thermal energy transfer element, having a sleeve shown in a cut-away view.

Referring to FIG. 3B, in some embodiments, each thermal energy transfer element 32 is comprised of a thermally conductive core 34, a sleeve 36, where at least one portion of the core 34 is surrounded with the sleeve 36. The core 34 may be formed from any material capable of conducting a sufficient amount of thermal energy to maintain the cell within the prescribed temperature range. The sleeve material should have a melting point sufficiently above the maximum expected internal temperature of the battery. However, because the sleeve 36 serves to prevent the core 34 from reacting with the electrolyte or interfering with the electrochemical reaction inside the battery container 26, it is not essential that the material be inert with respect to the reaction. Nor is it essential that the sleeve material be a poor electrical conductor, though this is preferred. For example, the core 34 may be as copper, aluminum, or brass. One of ordinary skill in the art will be aware of other suitable materials.

The sleeve 36 may be made from any material that is inert with respect to the chemical reaction in the cell and have a melting point sufficiently above the maximum expected internal temperature of the battery. In addition, the material should preferably function as a generally good electrical insulator, though this is not essential. Generally, the material should be a poor thermal insulator, at least when it is provided in the form of a thin layer surrounding the core 34. The sleeve 36 may be made relatively thin in order to provide relatively good overall thermal conductivity. For example, a coating of a polyethylene or ceramic material may be used. Polyethylene, such as VLPDE (very low density polyethylene), is one preferred coating material because it has excellent chemical resistance and a melting point above 100° C. Magnesium oxide is one example of a ceramic that may be used as sleeve material. One of ordinary skill in the art will be aware of other suitable materials.

Referring to FIG. 3B, the thermal energy transfer element 32 includes first and second portions, designated respectively by reference numbers 38 and 40. In the example shown in FIG. 3, the sleeve 36 surrounds only the first portion of the core 34. While it is important that the sleeve 36 surrounds the first portion 38, it is not essential for the sleeve 36 to surround the second portion 40. The reason is that the first portion 38 is surrounded by and in direct contact with the electrolyte 24, whereas the second portion 40 is external to the container 26 and does not come into direct contact with the electrolyte 24. However, in some embodiments, the sleeve 36 may surround the second portion 40.

Comparing FIG. 1B with FIGS. 2A and 2B, an advantage of the claimed inventions can be seen. After placement of the four transfer elements 32 in the cell in direct contact with the electrolyte, much of the electrolyte located midway between the container walls and the rod 22, which was previously not proximate a wall or the rod, is now close to one of the four transfer elements. Thus, thermal energy is more readily transferred to or from the electrolyte when the transfer elements 32 are in place than is the case when they are absent.

Any number of transfer elements 32 may be used, however, as more elements are used, performance improves (up to a point). Battery life was measured in an experiment using a single cell zinc-carbon battery similar to the battery 20 and zero to three transfer elements. As the results below show, use of the transfer elements increases battery life. The times are in hours and each battery was subject to a similar test load until it reached full discharge.

| Trial | Number of Transfer Elements | | | |
|---|---|---|---|---|
| | 0 | 1 | 2 | 3 |
| A | 4.78 | 7.95 | 9.07 | 8.02 |
| B | 5.27 | 7.87 | 8.95 | 7.9 |
| C | 5.32 | 7.58 | 9.12 | 8.35 |

The thermal energy transfer elements 32 may be made in various shapes and sizes. The first portion 38 of the exemplary transfer element 32 shown in FIGS. 3A-B has an elongated, bar shape. The bar may be round (rod-like) or rectangular. This embodiment is desirable for placing the transfer element 32 in a fully assembled battery, as insertion of element may be performed by boring a hole in the battery. However, the transfer element 32 is not limited to the shape shown in FIGS. 3A-B.

The transfer element 32 may be provided in a variety of shapes. Such alternative shapes and structures may provide a greater surface area of contact with the electrolyte. Some of these shapes and structures may be readily used when the element 32 is placed within a battery during battery assembly.

Figure 6A:
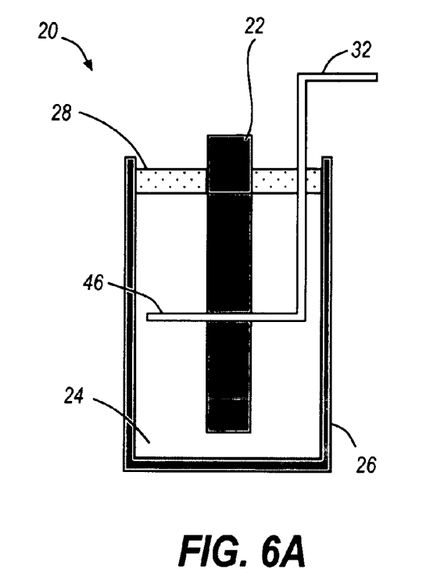
FIG. 6A is a cut-away side view of an exemplary battery that includes a thermal energy transfer element according to one embodiment and FIG. 6B is a perspective view of the element.
Figure 6B:
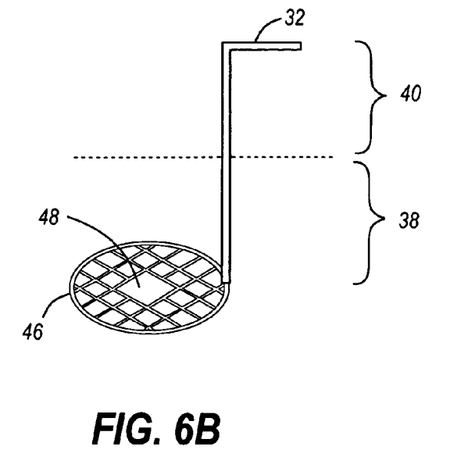

FIG. 6A is a cut-away side view of an exemplary battery 20 that includes a thermal energy transfer element according to one alternative embodiment and FIG. 6B is a perspective view of the element 32. In this alternative, at least one substantially flat or planar structure 46 ("third portion") formed that may be formed in an annular or circular shape is coupled with the first portion 38. The third portion 46 forms a mesh or grid of elongated members within a ring-shaped frame. The structure 46 may be made of the same material as the transfer element 32 and may coated or surrounded with sleeve portions made from the same material as the sleeve 36. The mesh structure 46 includes an aperture or cut-out 48 in the center so that it may be placed concentrically around a central electrode 22. As shown in FIG. 6A, the mesh structure 46 is oriented perpendicular to the longitudinal axis of the electrode 22. Although just one mesh structure 46 is shown, more than one may be coupled with the first portion 38. In one alternative, the mesh structure 46 is rectangular and oriented parallel to the electrode.

Figure 7A:
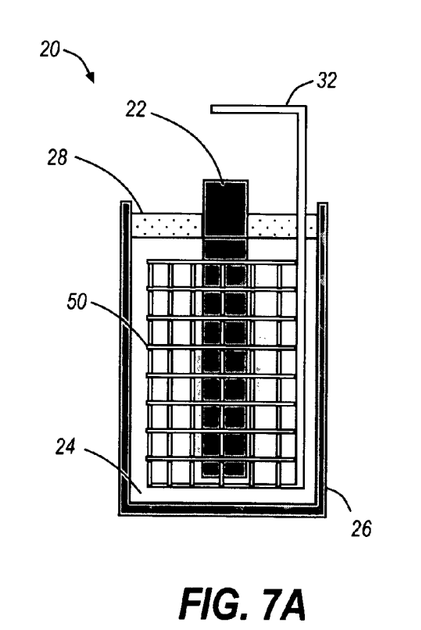
FIG. 7A is a cut-away side view of an exemplary battery that includes a thermal energy transfer element according to another embodiment and FIG. 7B is a perspective view of the element.
Figure 7B:
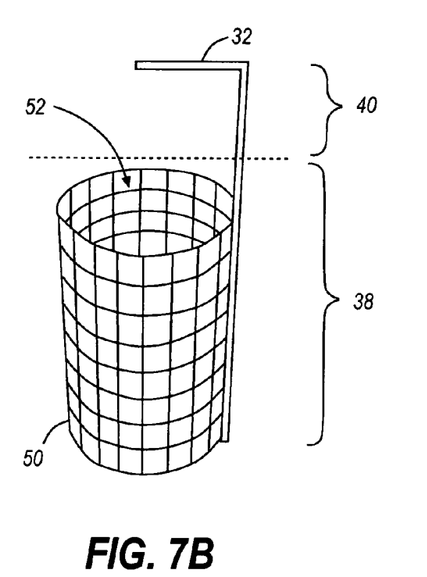

FIG. 7A is a cut-away side view of an exemplary battery 20 that includes a thermal energy transfer element according to another embodiment and FIG. 7B is a perspective view of the element 32. In this alternative, at least one cylindrical mesh structure 50 ("third portion") is coupled with the first portion 38. Like the structure 46, the third portion 50 forms a mesh or grid of elongated members within a ring-shaped frame. Similarly, the structure 50 may be made of the same material as the transfer element 32 and may coated or surrounded with sleeve portions made from the same material as the sleeve 36. The mesh structure 50 includes an aperture 52 in the center so that it may be placed concentrically around a central electrode 22.

Figure 8A:
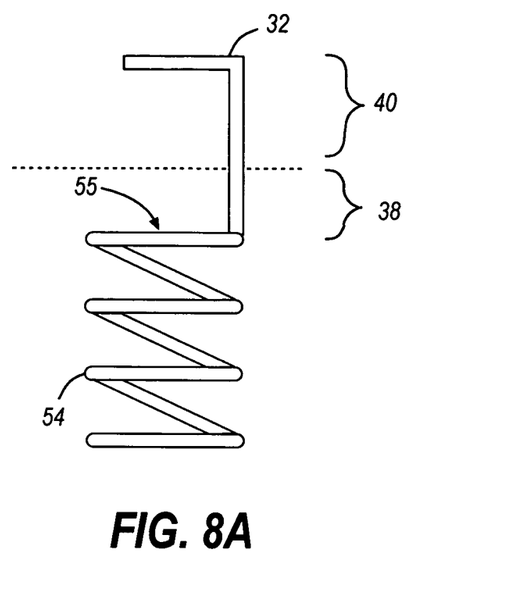
FIG. 8A is a side plan view and FIG. 8B is a top plan view of yet another embodiment of a thermal energy transfer element.
Figure 8B:
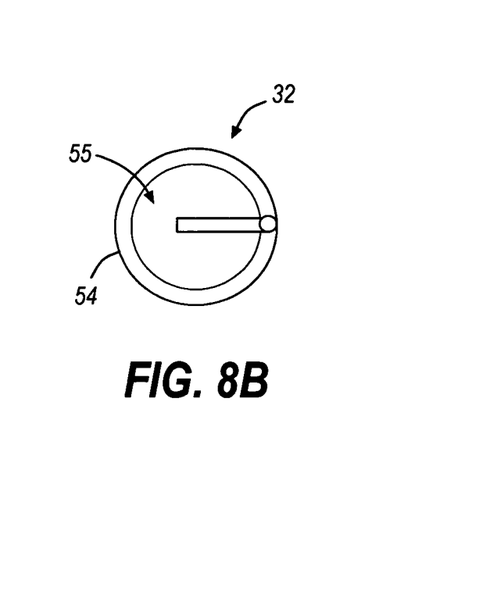
Figure 8C:
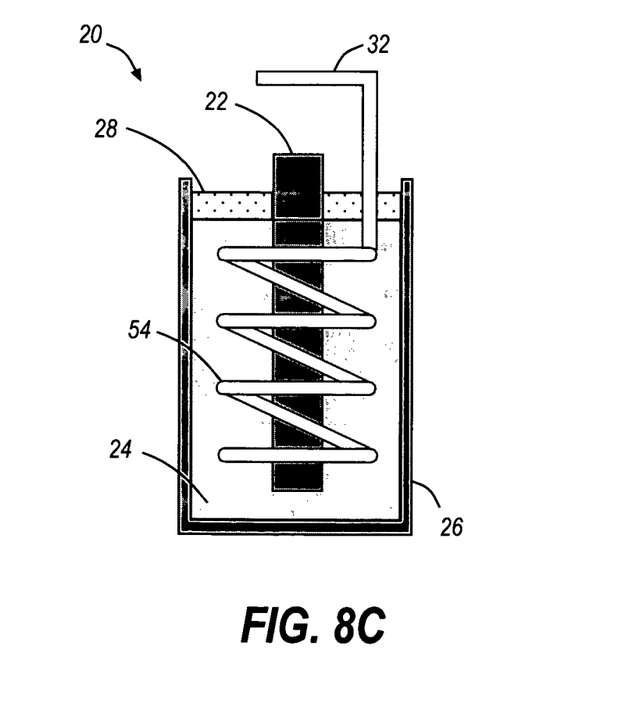
FIG. 8C is a cut-away side view of an exemplary battery that includes a thermal energy transfer element according to this embodiment.

FIG. 8A is a side plan view and FIG. 8B is a top plan view of yet another embodiment of a thermal energy transfer element 32, and FIG. 8C is a cut-away side view of an exemplary battery that includes a thermal energy transfer element 32 according to this embodiment. In this alternative, a spiral or corkscrew shaped structure 54 ("third portion") is coupled with the first portion 38. The third portion 54 may be made of the same material as the transfer element 32 and may coated or surrounded with sleeve portions made from the same material as the sleeve 36. The spiral structure 55 includes an opening 55 in the center so that it may be placed concentrically around a central electrode 22.

Figures 9A, 9B:
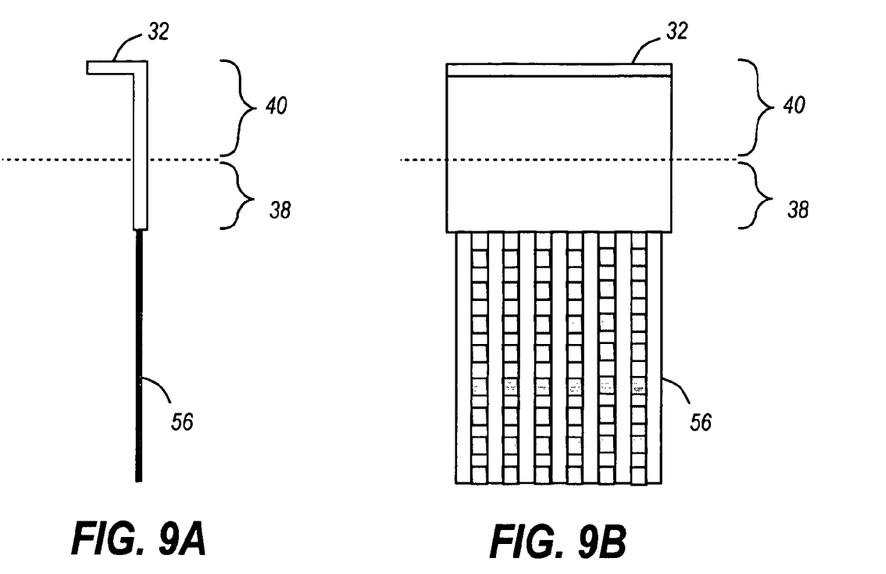
FIG. 9A is a left-side plan view and FIG. 9B is a front side plan view of a thermal energy transfer element according to an additional embodiment.
Figure 9C:
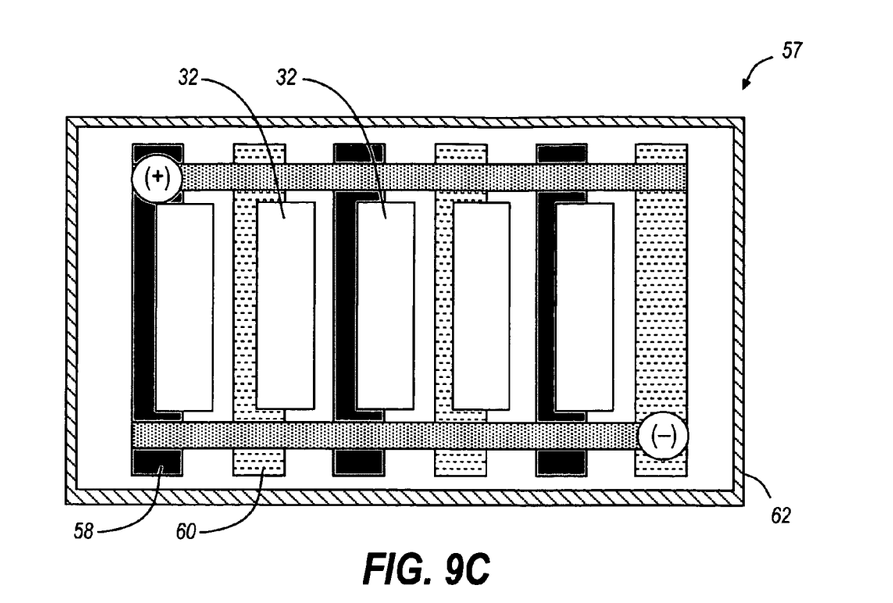
FIG. 9C is a top-side plan view and FIG. 9D is a side plan view of an exemplary battery that includes a plurality of thermal energy transfer elements according to this embodiment.
Figure 9D:
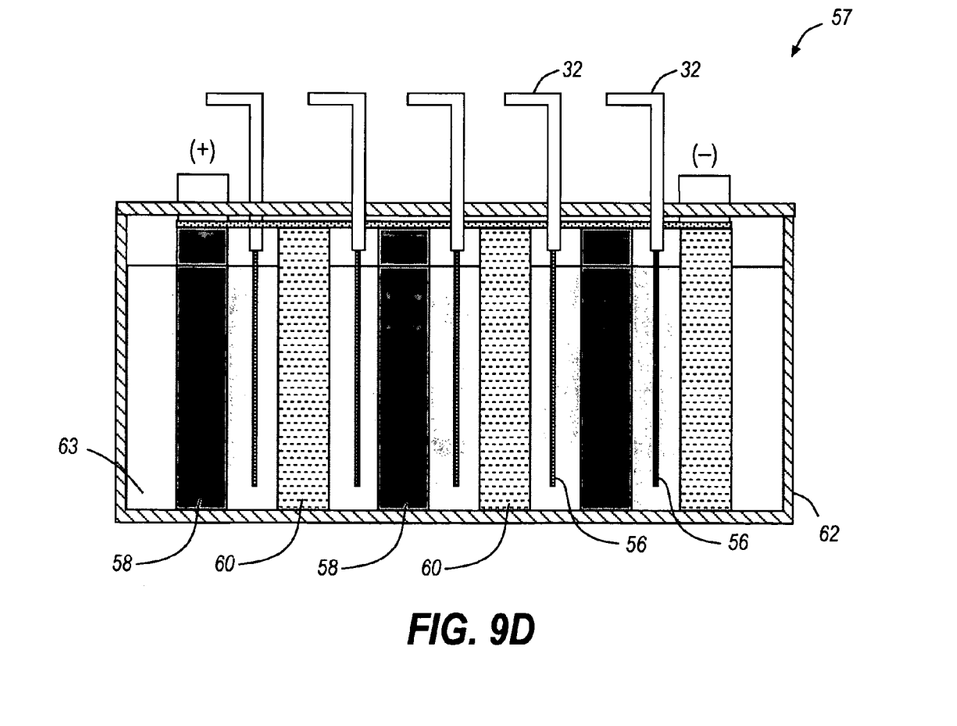

FIG. 9A is a left-side plan view and FIG. 9B is a front side plan view of a thermal energy transfer element 32 according to an additional embodiment. FIG. 9C is a top-side plan view and FIG. 9D is a side plan view of an exemplary battery 57 that includes a plurality of thermal energy transfer elements according to this embodiment. In this alternative, elongated members form a rectangular a mesh or grid 56 ("third portion") that is coupled with the first portion 38. The third portion 56 may be made of the same material as the transfer element 32 and may coated or surrounded with sleeve portions made from the same material as the sleeve 36. The planar mesh structure 56 may be placed parallel to one or more electrodes. The exemplary battery 57 includes a plurality of rectangular shaped cathodes 58 and anodes 60 enclosed in a container 62 and a liquid electrolyte 63. The third portions 56 are disposed in parallel relation between cathode-anode pairs.

Figure 10A:
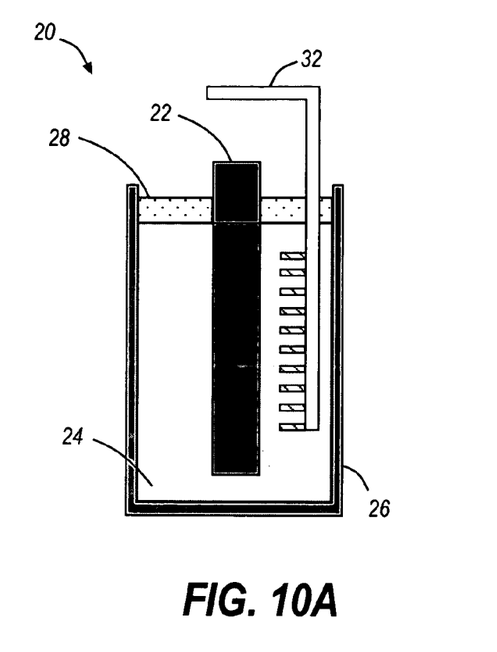
FIG. 10A is a cut-away, side view of an exemplary battery that includes a thermal energy transfer element according to a further embodiment.
Figure 10B:
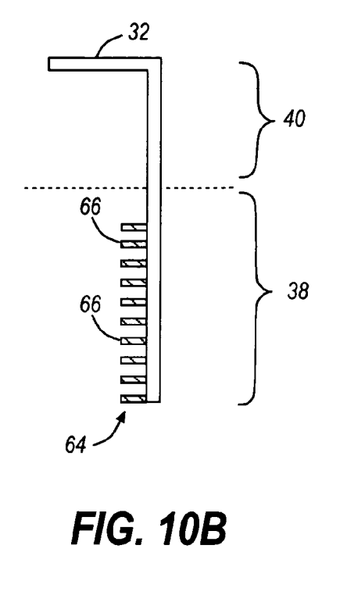
FIG. 10B is a side view of the thermal energy transfer element according to this embodiment.

FIG. 10A is a cut-away, side view of an exemplary battery 20 that includes a thermal energy transfer element 32 according to a further embodiment. FIG. 10B is a side view of the thermal energy transfer element 32 according to this embodiment. In this alternative, a plurality of horizontally oriented fins 66 forming a third portion 64 is coupled with the first portion 38. Thus, the third portion 64 may be described as having a "comb" shape. The fins 66 may oriented vertically, or in another desired direction. As shown in FIG. 10A, the transfer element 32 may be placed in parallel relation to one or more electrodes.

The second portion 40 of the various exemplary transfer elements 32 described above may have an elongated, bar shape, but it comprises two sections that are at a right angle to one another. Like the first portion 38, the second portion 40 is not limited to the shape shown in the figures. In one embodiment, the second portion 40 includes two or more portions that are perpendicular to the long axis of an elongated first portion. In another embodiment, the second portion 40 of the transfer element 32 is flexible so that it can be adjusted so that different portions of the second portion 40 may be to coupled with a conventional heat sink external to the battery, as described below.

Figure 4:
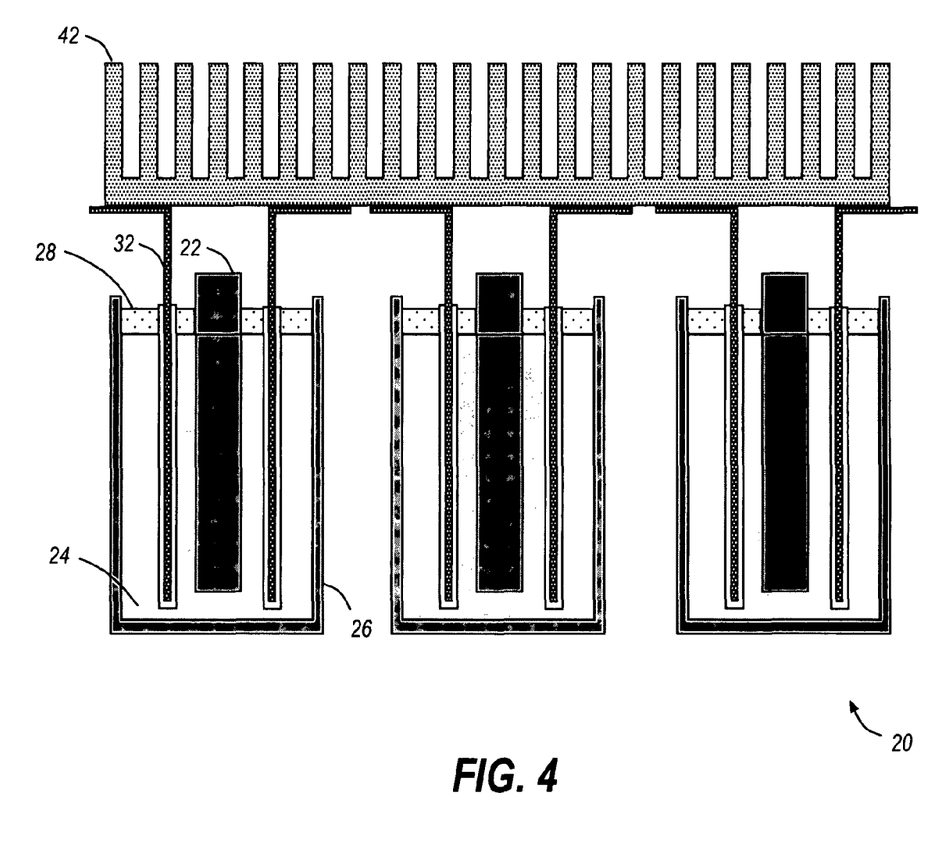
FIG. 4 is a cut-away side view of an embodiment in which two thermal energy transfer elements are provided for each cell in a plurality of battery cells, and a heat sink.
Figure 5:
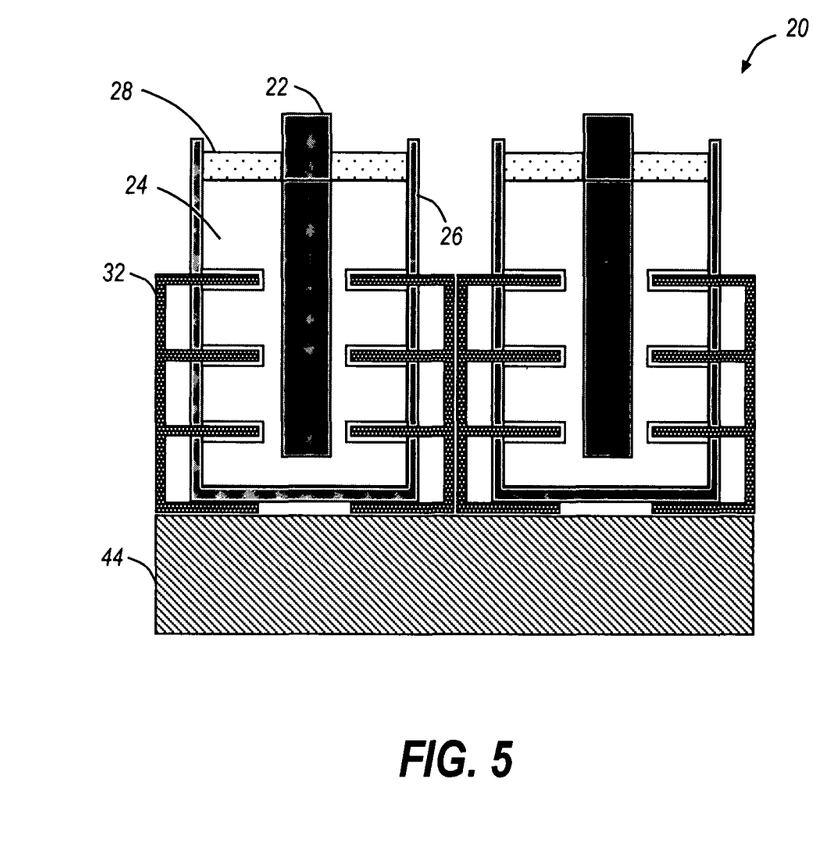
FIG. 5 is a cut-away side view of an embodiment in which two thermal energy transfer elements are provided for each cell in a plurality of battery cells, and a heat source.

The second portion 40 may be thermally coupled with a conventional heat sink or a heat source. In addition, in one embodiment, at least one transfer element 32 is provided for each battery cell in a group of two or more battery cells, and all of the transfer elements 32 are attached to a single heat sink 42. FIG. 4 is a cut-away, side view showing one example of this embodiment. It should be appreciated that it is not necessary that a single heat sink 42 be shared between two or more cells. In other alternatives, a dedicated heat sink is provided for each cell. FIG. 5 is a cut-away, side view showing one example of a similar embodiment where the all of the transfer elements 32 are attached to a single heat source 44.

The transfer elements 32 may be disposed so that they enter the top of the battery and so the elongated first portion 38 is parallel to a height axis of the battery 20, as shown in FIG. 2A. It is not necessary, however, that transfer elements 32 enter the top of the battery or that they be oriented as shown; the transfer elements may enter the bottom or side walls as desired. In addition, it is not necessary that the first portion 38 be parallel to a height axis of the battery 20, the first portion 38 may lie along any desired plane or may lie in more than one plane. For example, the first portion 38 may be parallel to a horizontal, width axis of the battery 20. FIG. 5 illustrates one example of the first portions 38 oriented parallel to the width axis of a cell.

The claimed inventions may be used with any type of battery, including but not limited to: dry and wet cell batteries, primary batteries, and rechargeable batteries. The claimed inventions may be used with single and multi-cell batteries. Further, the claimed inventions may be used with any type of battery chemistry, including, but not limited to, lithium ion, and nickel metal hydride chemistries. The claimed inventions may be used with batteries having an electrolyte of any type, including liquid, paste, or solid.

As described above, the transfer element 32 may be provided in a variety of shapes. In alternative embodiments, it was said above that at least one third portion may be coupled with the first portion 38. It should be appreciated that the use of the term "couple" is in intended in its broadest possible sense. The term is intended to include not only gluing, welding, soldering, screwing, riveting, and other conventional means of attachment, but also to include forming the first and third portions as an integral unit, such as where they are formed from a single mold or machined from a single piece of starting material.

In this document, particular structures, processes, and operations well known to the person of ordinary skill in the art may not have be described in detail in order to not obscure the description. As such, embodiments of the claimed inventions may be practiced even though such details are not described. On the other hand, certain structures, processes, and operations may have be described in some detail even though such details may be well known to the person of ordinary skill in the art. This may be done, for example, for the benefit of the reader who may not be a person of ordinary skill in the art. Accordingly, embodiments of the claimed inventions may be practiced without some or all of the specific details that are described.

In this document, references may have been made to "one embodiment" or "an embodiment." These references mean that a particular feature, structure, or characteristic described in connection with the embodiment is included in at least one embodiment of the claimed inventions. Thus, the phrases "in one embodiment" or "an embodiment" in various places are not necessarily all referring to the same embodiment. Furthermore, particular features, structures, or characteristics may be combined in one or more embodiments.

Although embodiments have been described in some detail for purposes of clarity of understanding, it will be apparent that certain changes and modifications may be practiced within the scope of the appended claims. Accordingly, the described embodiments are to be considered as illustrative and not restrictive, and the claimed inventions are not to be limited to the details given herein, but may be modified within the scope and equivalents of the appended claims. Further, the terms and expressions which have been employed in the foregoing specification are used as terms of description and not of limitation, and there is no intention in the use of such terms and expressions to exclude equivalents of the features shown and described or portions thereof, it being recognized that the scope of the inventions are defined and limited only by the claims which follow.

I claim:

1. A battery, comprising:
   an anode, a cathode, and a container;
   a thermal energy transfer element distinct from the anode and cathode, and including a thermally conductive core having a first portion located within the container and a second portion located external to the container;
   an electrolyte within the container in direct contact with at least a part of the first portion of the thermally conductive core, the anode, and the cathode, wherein the first portion provides a path for conducting thermal energy between the electrolyte and the second portion.

2. The battery of claim 1, wherein the second portion is coupled with a heat sink.

3. The battery of claim 1, wherein the thermally conductive core is formed of silicon carbide.

4. The battery of claim 3, wherein the second portion is coupled with a heat sink.

5. The battery of claim 1, further comprising a third portion coupled with the first portion, the third portion including a mesh of elongated members.

6. The battery of claim 1, further comprising a third portion coupled with the first portion, the third portion being an elongated member formed in a spiral shape.

7. The battery of claim 1, wherein the first portion includes an elongated member having a rectangular shape, further comprising a third portion coupled with the first portion, the third portion including a plurality of fins oriented transverse to the length of the first portion.

8. A battery, comprising:
   at least one cell container having bottom and side walls, containing an electrolyte, and serving as a first electrode;
   a second electrode having a first portion embedded in the electrolyte and a second portion located external to the electrolyte; and
   at least one thermal energy transfer element spaced away from the second electrode and the bottom and side walls of the container, the thermal energy transfer element including a thermally conductive core having a first portion located within the cell container and in direct contact with and surrounded by the electrolyte, and a second portion located external to the cell container.

9. The battery of claim 8, wherein the second portion is coupled with a heat sink.

10. The battery of claim 8, wherein the thermally conductive core is formed of silicon carbide.

11. The battery of claim 8, further comprising a sleeve surrounding at least the first portion.

12. The battery of claim 11, wherein the sleeve is formed of polyethylene.

13. The battery of claim 11, wherein the sleeve is formed of ceramic.

14. The battery of claim 8, wherein the battery is a zinc-carbon battery.

15. The battery of claim 8, wherein the first portion includes an elongated member having a rectangular shape.

16. The battery of claim 14, further comprising a third portion coupled with the first portion, the third portion including a mesh of elongated members.

17. The battery of claim 14, further comprising a third portion coupled with the first portion, the third portion being an elongated member formed in a spiral shape.

18. The battery of claim 14, further comprising a third portion coupled with the first portion, the third portion including a plurality of fins oriented transverse to the length of the first portion.

* * * * *